United States Patent
Hoffmeister et al.

(10) Patent No.: US 8,864,624 B2
(45) Date of Patent: Oct. 21, 2014

(54) METHOD FOR SHIFTING A SEMI-AUTOMATIC POWERSHIFT TRANSMISSION

(75) Inventors: Jan-Peter Hoffmeister, Leonberg (DE); Simon Dylla, Pforzheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 151 days.

(21) Appl. No.: 13/405,925

(22) Filed: Feb. 27, 2012

(65) Prior Publication Data

US 2012/0216640 A1    Aug. 30, 2012

(30) Foreign Application Priority Data

Feb. 28, 2011 (DE) .......................... 10 2011 000 957

(51) Int. Cl.
| | |
|---|---|
| B60W 10/02 | (2006.01) |
| F16H 59/00 | (2006.01) |
| F16D 48/06 | (2006.01) |
| B60W 30/19 | (2012.01) |
| F16H 61/06 | (2006.01) |
| F16H 63/46 | (2006.01) |
| B60W 10/11 | (2012.01) |
| B60W 10/06 | (2006.01) |
| F16H 63/50 | (2006.01) |
| F16H 61/688 | (2006.01) |
| F16H 59/68 | (2006.01) |

(52) U.S. Cl.
CPC ............ *F16H 61/061* (2013.01); *F16D 48/066* (2013.01); *F16D 2500/1086* (2013.01); *F16H 61/688* (2013.01); *F16H 2059/683* (2013.01); *B60W 30/19* (2013.01); *F16D 2500/5014* (2013.01); *F16H 63/46* (2013.01); *B60W 10/02* (2013.01); *B60W 10/11* (2013.01); *F16D 2500/70414* (2013.01); *F16D 2500/3024* (2013.01); *B60W 10/06* (2013.01); *F16H 63/502* (2013.01)
USPC ............................................... 477/70; 74/335

(58) Field of Classification Search
CPC ..... F16H 61/16; F16H 61/2807; F16H 61/32; F16H 61/30; F16H 61/12; F16H 59/70; F16H 61/702; B60K 41/00; B60W 10/02; B60W 10/11; B60W 30/18
USPC .............. 74/335; 477/70, 127, 128, 130, 131, 477/143; 475/121, 128
See application file for complete search history.

(56) References Cited

U.S. PATENT DOCUMENTS

| | | | |
|---|---|---|---|
| 4,422,350 A | 12/1983 | Muller et al. | |
| 4,724,723 A * | 2/1988 | Lockhart et al. | ............. 477/102 |

(Continued)

FOREIGN PATENT DOCUMENTS

| | | |
|---|---|---|
| DE | 3010865 A1 | 10/1981 |
| DE | 102005016672 A1 | 10/2006 |
| EP | 1953424 A2 | 8/2008 |

*Primary Examiner* — Troy Chambers
*Assistant Examiner* — Jude Agendia
(74) *Attorney, Agent, or Firm* — RatnerPrestia

(57) ABSTRACT

A method for shifting a semi-automatic powershift transmission used in a motor vehicle during a manually triggered traction upshift involves the shift phases of the charging of an actuator of a clutch to be engaged, an overlap of the charging of the actuator of the clutch to be engaged and the emptying of an actuator of a clutch to be disengaged, and also involves an engine rotational speed alignment. The charging, the overlap and the engine rotational speed alignment are carried out simultaneously. In the shift process during a manually triggered shift, the driver perceives a change in engine rotational speed with only a minimal delay after the shift command.

4 Claims, 2 Drawing Sheets

(56) References Cited

U.S. PATENT DOCUMENTS

| | | | |
|---|---|---|---|
| 4,790,418 A * | 12/1988 | Brown et al. | 701/51 |
| 5,964,675 A * | 10/1999 | Shimada et al. | 475/123 |
| 6,726,589 B2 * | 4/2004 | Horiguchi | 475/116 |
| 6,832,978 B2 * | 12/2004 | Buchanan et al. | 477/174 |
| 7,086,989 B2 * | 8/2006 | Siebigteroth et al. | 477/109 |
| 7,381,151 B2 * | 6/2008 | Shim | 477/154 |
| 7,682,285 B2 * | 3/2010 | Kraska et al. | 477/130 |
| 8,079,936 B2 * | 12/2011 | MacFarlane et al. | 477/109 |
| 8,137,241 B2 * | 3/2012 | Bai | 477/110 |
| 2004/0198552 A1 * | 10/2004 | Bothe et al. | 477/127 |
| 2007/0149351 A1 * | 6/2007 | Inuta | 477/70 |
| 2007/0155584 A1 * | 7/2007 | Tabata et al. | 477/70 |
| 2009/0118936 A1 * | 5/2009 | Heap et al. | 701/54 |
| 2009/0149295 A1 * | 6/2009 | Yamamoto et al. | 477/109 |

* cited by examiner

METHOD FOR SHIFTING A SEMI-AUTOMATIC POWERSHIFT TRANSMISSION

CROSS-REFERENCE TO RELATED APPLICATION

This U.S. patent application claims priority to German Patent Application DE 102011000957.4, filed Feb. 28, 2011, which is incorporated by reference herein in its entirety.

FIELD OF THE INVENTION

The invention relates to a method for shifting a semi-automatic powershift transmission used in a motor vehicle during a manually triggered traction upshift, involving the shift phases of the charging of an actuator of a clutch to be engaged, an overlap of the charging of the actuator of the clutch to be engaged and the emptying of an actuator of a clutch to be disengaged, and also involving an engine rotational speed alignment.

BACKGROUND OF THE INVENTION

In a powershift transmission, which is for example a dual clutch transmission, the different shift phases of charging, overlap and engine rotational speed alignment are carried out sequentially one after the other in conventional traction upshifts. A high level of shift comfort is obtained in this way. Automatically triggered shifts can take place quickly and in a jerk-free manner. In the case of manually triggered (tipped) shifts, the charging and overlap phases are perceived as a considerable delay between the shift command and the time at which the change in rotational speed takes place. The driver experiences this as being non-spontaneous and sluggish.

EP 1 953 424 A2, which is incorporated by reference herein, describes a method for controlling the shift pressure in an actuator of an electrohydraulically controlled motor vehicle transmission. Here, a setpoint value for the start pressure at the end of the charging phase is defined as a function of the torque output by the drive engine.

From DE 10 2005 016 672 A1, which is incorporated by reference herein, it is known to refine the adaptation steps during the charging of shift elements of an automatic gearbox.

DE 30 10 865 A1, which is incorporated by reference herein, describes a method for controlling an automatic multistage transmission in motor vehicles. Here, the charging state of the clutch is monitored in order to save time at the transition of the charging and overlap phases.

SUMMARY OF THE INVENTION

Disclosed herein is a method of the type mentioned in the introduction such that, during a to manually triggered shift, the driver perceives a change in engine rotational speed with only a minimal delay after the shift command.

The charging, the overlap and the engine rotational speed alignment are carried out simultaneously.

As a result of the simultaneous execution of charging, overlap and rotational speed alignment, the change in rotational speed begins with only a minimal delay after the manual shift command.

The driver barely perceives this minimal delay, and therefore feels an immediate reaction to his manually triggered shift command. This minimal delay is usually considerably less than 200 ms. However, the shift according to the invention can lead to jerks. As a result of the simultaneous intervention of the drive machine/of the engine for rotational speed alignment, the jerk can be kept to a minimum, and is additionally perceived as a spontaneous reaction in the case of manually triggered shifts. In the case of manually triggered shifts, in particular in a sports car, said jerk is not perceived negatively.

It is provided in particular that the charging is terminated on the basis of a pressure sensor signal. This makes it possible for the charging to be carried out and ended in an optimal fashion.

The powershift transmission is in particular a dual clutch transmission.

BRIEF DESCRIPTION OF THE DRAWING

Preferred refinements of the invention will emerge from the following description. A preferred exemplary embodiment of the invention will be explained in more detail on the basis of the drawing, without the invention being restricted thereto. The drawing also shows an exemplary embodiment according to the prior art.

DETAILED DESCRIPTION OF THE DRAWING

Figure 1:
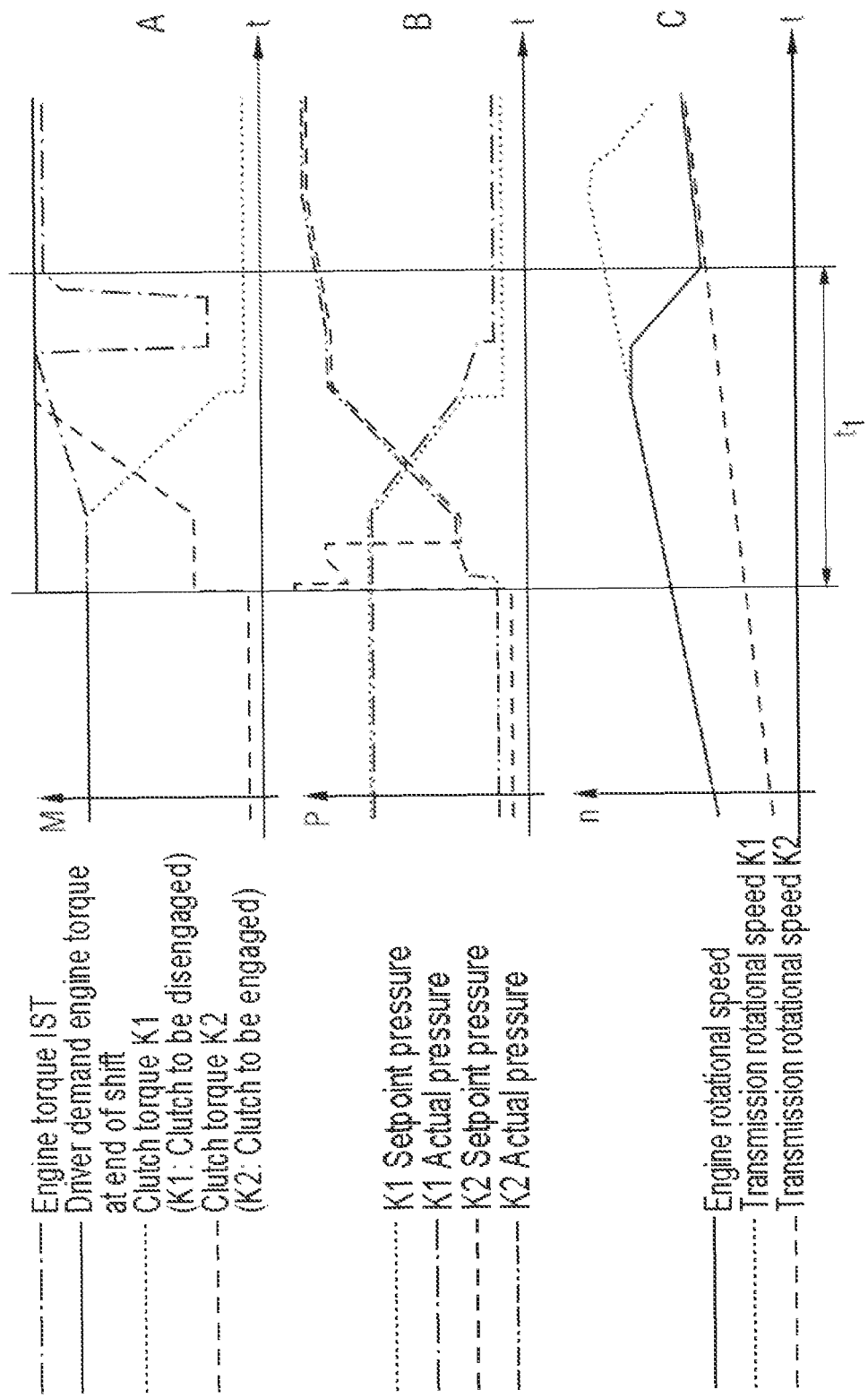
Figure 2:
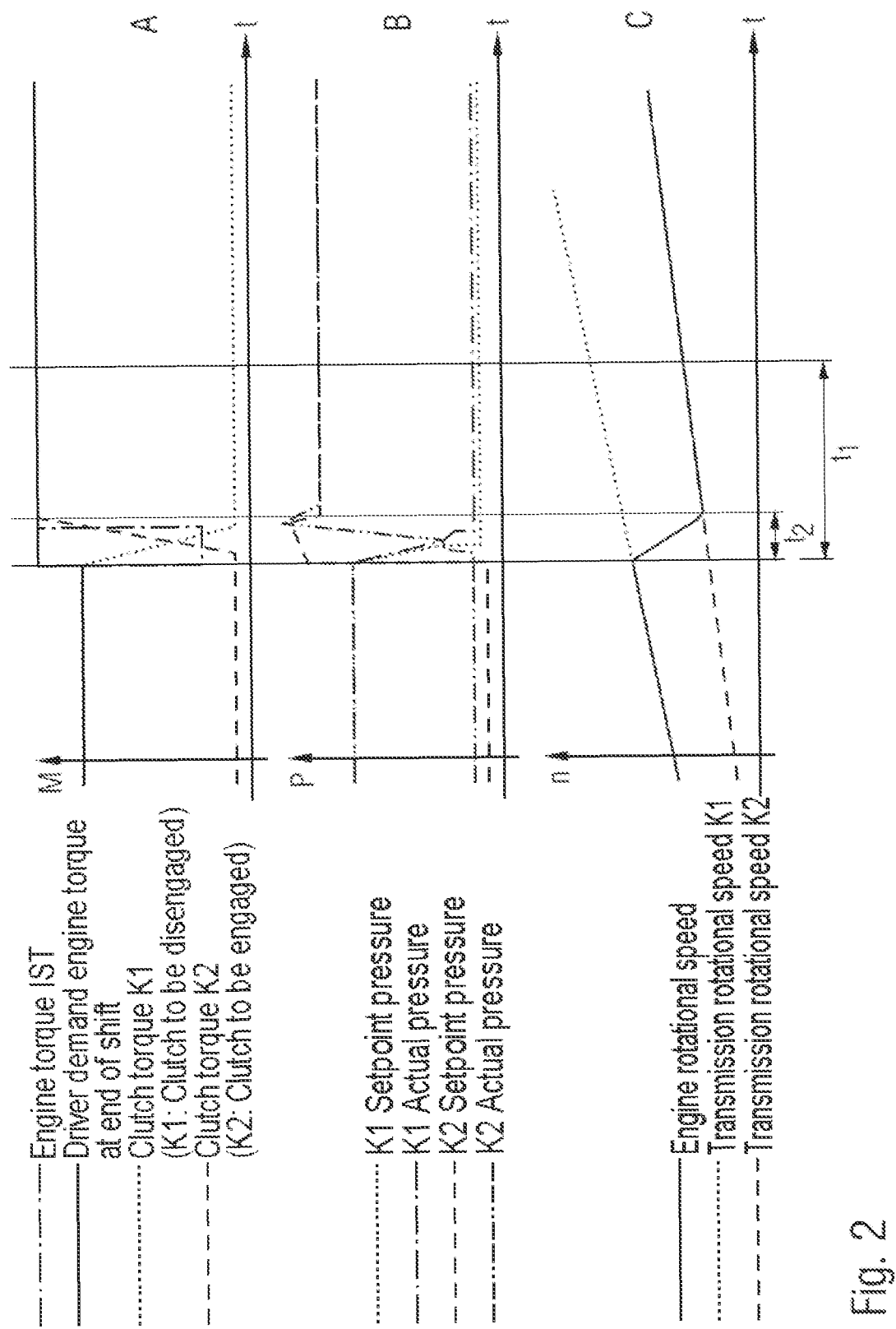

In the drawing:

FIG. 1 shows diagrams A, B and C for illustrating the method known from the prior art, FIG. 2 shows diagrams A, B and C for illustrating the method according to the invention.

In FIGS. 1 and 2, the respective diagrams A, B and C show, on the same time axis t, the dependency of characteristic variables. The diagram A shows a torque-time characteristic curve, the diagram B shows a pressure-time characteristic curve, and the diagram C shows a rotational speed-time characteristic curve.

The individual torques, pressures and rotational speeds are specified in greater detail in the legends for the respective FIGS. 1 and 2.

FIG. 1 shows the conventional shift process, that is to say the sequential process of charging, overlap and rotational speed alignment. It can be seen from diagrams A and B that, during the charging, the actual pressure and the setpoint pressure in the actuator of the clutch K2, that is to say of the clutch to be engaged, is initially increased, resulting in an increase in the clutch torque of the clutch K2. During said time interval, the actual pressure and the setpoint pressure in the actuator of the clutch K1, that is to say of the clutch to be disengaged, and also the clutch torque of the clutch K1, remain unchanged. Only thereafter does the overlap interval take place, with further increasing pressure (setpoint pressure/actual pressure) in the actuator for the clutch K2 (further charging) and activation of the actuator for the clutch K1 to decrease the pressure (setpoint pressure/actual pressure) in said actuator, and therefore the emptying of said actuator. Said interval corresponds to that in diagram A, which illustrates the decrease in the clutch torque K1 and the increase in the clutch torque K2. It can be seen from diagram A that the engine rotational speed alignment, illustrated by the engine torque IST and in diagram C by the engine rotational speed, takes place only after the overlap is complete.

It can be seen from the diagrams of FIG. 1 that the charging and overlap phases are perceived as a significant delay between the shift command and the time at which the change in rotational speed takes place. The shift command takes place at the time of the discontinuous increase in the driver demand engine torque in diagram A or of the discontinuous increase in the setpoint pressure in the actuator of clutch K2 in diagram B.

FIG. 2 shows the characteristic curves of FIG. 1 as explained above, but for the method according to aspects of the invention, that is to say the simultaneous execution of charging, overlap and engine rotational speed alignment. It can be seen that the engine intervention takes place at the same time as the start of the manually triggered (tipped) shift, and an immediate overlap of the clutch torques K1 and K2 takes place, as can be seen from diagram A, and the immediate overlap of setpoint pressure and actual pressure of the actuators of the clutches K1 and K2 also takes place, as per diagram B. The actuator of the clutch K2 to be engaged is immediately acted on with approximately the maximum setpoint pressure, and the emptying of the actuator of the clutch K1 to be disengaged is also commenced at this time. With regard to the actual characteristic curves of the pressure shown in diagram B, the emptying of the clutch K1 to be disengaged and the charging of the clutch K2 to be engaged take place approximately in the same short period of time, which is significantly shorter than in the conventional shift process as per FIG. 1, and the engine rotational speed alignment also takes place in this time interval, as can be seen from diagrams C and from the engine torque IST from diagram A.

The termination of the charging of the actuator of the clutch K2 to be engaged takes place on the basis of a pressure sensor signal. The K2 setpoint pressure characteristic curve according to diagram B in FIG. 2 accordingly differs significantly from that according to diagram B in FIG. 1.

Owing to the simultaneous charging, overlap and engine rotational speed alignment in the method according to aspects of the invention, the change in rotational speed begins with only a minimal delay after the manual shift command.

The relatively long time interval in the conventional shift process is denoted in FIG. 1 by $t_1$, and the shortened time interval according to aspects of the invention is denoted in FIG. 2 by $t_2$.

The invention claimed is:

1. A method for shifting a semi-automatic powershift transmission used in a motor vehicle during a manually triggered traction upshift, said method comprising the steps of:
    charging an actuator of a clutch to be engaged,
    emptying an actuator of a clutch to be disengaged, and
    decreasing the engine rotational speed,
    wherein the charging, emptying and decreasing steps are initiated simultaneously,
    wherein the decreasing step is carried out until the engine rotational speed is aligned with a rotational speed of the transmission shaft associated with the clutch to be engaged.

2. The method as claimed in claim 1, wherein the charging step is terminated on the basis of a pressure sensor signal.

3. The method as claimed in claim 1, wherein a powershift transmission configured as a dual clutch transmission is shifted.

4. The method as claimed in claim 1, wherein the charging and emptying steps are carried out at the start of the manually triggered traction upshift.

* * * * *